United States Patent [19]

Durant et al.

[11] Patent Number: 4,881,573
[45] Date of Patent: Nov. 21, 1989

[54] FEMALE HYDRAULIC COUPLER WITH PUSH-CONNECT AND LEVER DISCONNECT

[75] Inventors: Douglas M. Durant, Waterloo; Uwe H. Kugler, Cedar Falls; Bennie J. Vaughn, Cedar Falls; Douglas W. Nordquist, Cedar Falls; Larry M. Delfs, Cedar Falls, all of Iowa

[73] Assignee: Deere & Company, Moline, Ill.

[21] Appl. No.: 304,699

[22] Filed: Jan. 31, 1989

[51] Int. Cl.$^4$ ............................................. F16L 29/00
[52] U.S. Cl. ........................... 137/614.04; 137/614.06
[58] Field of Search .............. 137/614, 614.03, 614.04, 137/614.05, 614.06; 251/149.9

[56] References Cited

U.S. PATENT DOCUMENTS

| | | |
|---|---|---|
| 4,222,411 | 9/1980 | Hergan et al. ................. 137/614.04 |
| 4,249,572 | 2/1981 | Shindelar et al. . |
| 4,303,098 | 12/1981 | Shindelar . |
| 4,485,845 | 12/1984 | Brady . |
| 4,549,577 | 10/1985 | Kugler . |
| 4,582,295 | 4/1986 | Kugler et al. . |

Primary Examiner—John Fox

[57] ABSTRACT

A female coupler can operate in both a push-pull and a lever-actuated connect/disconnect fashion. Double lock ball controlling ramp surfaces are provided around the receiving bore of the coupler to allow the lock balls of the coupler to withdraw from the receiving bore when the receptacle is moved either into or out of the housing. The coupler can be moved into or out of the housing by pushing the male coupler into or pulling it out of the female coupler, or by use of a lever-actuated cam. A piston-type flow-check valve is provided to open the male check ball and hold it open despite transient surges. This flow-check valve is hydraulically actuated. A bleed valve for the hydraulically actuated flow-check valve is activated to release the flow-check valve when the lever is actuated or when the receptacle is pushed into the housing, thereby reducing the force needed for coupling. The lever can bleed and activate a plurality of couplers simultaneously, whereby multiple couplers can be connected or disconnected simultaneously.

14 Claims, 2 Drawing Sheets

FEMALE HYDRAULIC COUPLER WITH PUSH-CONNECT AND LEVER DISCONNECT

BACKGROUND OF THE INVENTION

1. Field of the Invention

The present invention relates to couplers for hydraulic hoses, and in particular, female couplers such as are used to connect hydraulic lines to operate an implement attached to or being towed by a work vehicle.

2. Description of the Related Art

Numerous female couplers are currently available for coupling to and uncoupling from a pressurized or non-pressurized male coupler. Such couplers are used extensively in hydraulic hook-ups, such as are used in agricultural and industrial vehicles. Some examples of such couplers are taught by U.S. Pat. Nos. 4,303,098 (Shindelar); 4,549,577 (Kugler); and 4,582,295 (Kugler et al.). These references all teach lever-operated female couplers, that is, female couplers in which a lever must be moved to allow insertion or removal of the male coupler. This has the disadvantage that the coupler requires two hands for operation, one to operate the lever and the other to insert or remove the male coupler from the female coupler.

Typically, the fluid power industry overcomes this problem by providing a push-pull/connect-disconnect female coupler which does not incorporate the lever-actuated cam, e.g., as taught in U.S. Pat. No. 4,485,845 (Brady). However, this type of coupler has the disadvantage that it no longer provides the controlled low effort disconnection of a lever disconnect structure, because the hydraulic fluid in the coupler might simply blow the male member out of the female coupler if only a low effort were required.

Finally, while some of these references, e.g., Shindelar, teach structures in which a lever can operate either of two adjacent female couplers alternately, none teach a mechanism which can decouple multiple couplers simultaneously. Couplers frequently are paired, so that it would be advantageous to be able to decouple them simultaneously.

SUMMARY OF THE INVENTION

It is the object of the present invention to provide a female coupler combining the desirable characteristics of a lever-actuated cam female coupler with those of a push-pull connect/disconnect female coupler. In particular, the couplers should be connectible through either lever or push action, and similarly disconnectible through either lever or pull action. At least one of the coupling and decoupling techniques available should be a low effort technique. Finally, multiple couplers should be disconnectible simultaneously.

These objects are accomplished according to the present invention by providing a female coupler with a slidably mounted receptacle having a plurality of lock balls at the receiving end thereof. Sloped surfaces on the sides of the female coupler move the lock balls into engagement with a groove on a male coupler inserted into the receptacle. The receptable is spring-biased to a normal position with the lock balls engaged with the male coupler, and the sloped surfaces slope away therefrom in either direction. Movement of the receptacle in either axial direction thus will disengage the lock balls from the male coupler, thereby allowing a push-pull feature.

A piston-actuated poppet is provided in the receptacle for sealing the end of the female coupler. Actuation of the piston when a male coupler is in position will force the male coupler open, allowing fluid connection between the male and female coupler.

A lever-actuated cam is provided at the end of the receptacle. This cam serves two functions: first, to open a bleed valve for bleeding the piston chamber and second, to move the receptacle axially into a position where the locking balls disengage. Bleeding the piston chamber allows low effort movement of the receptacle, and continued movement of the lever to press the receptacle into the lock-ball disengaged position provides a controlled uncoupling of the male coupler. Preferably, the lever activates cams operating multiple female couplers, so that multiple female couplers can be disconnected simultaneously

BRIEF DESCRIPTION OF THE DRAWINGS

The present invention will be described in greater detail with reference to the following figures in which.

DETAILED DESCRIPTION OF THE PREFERRED EMBODIMENT

Figure 1:
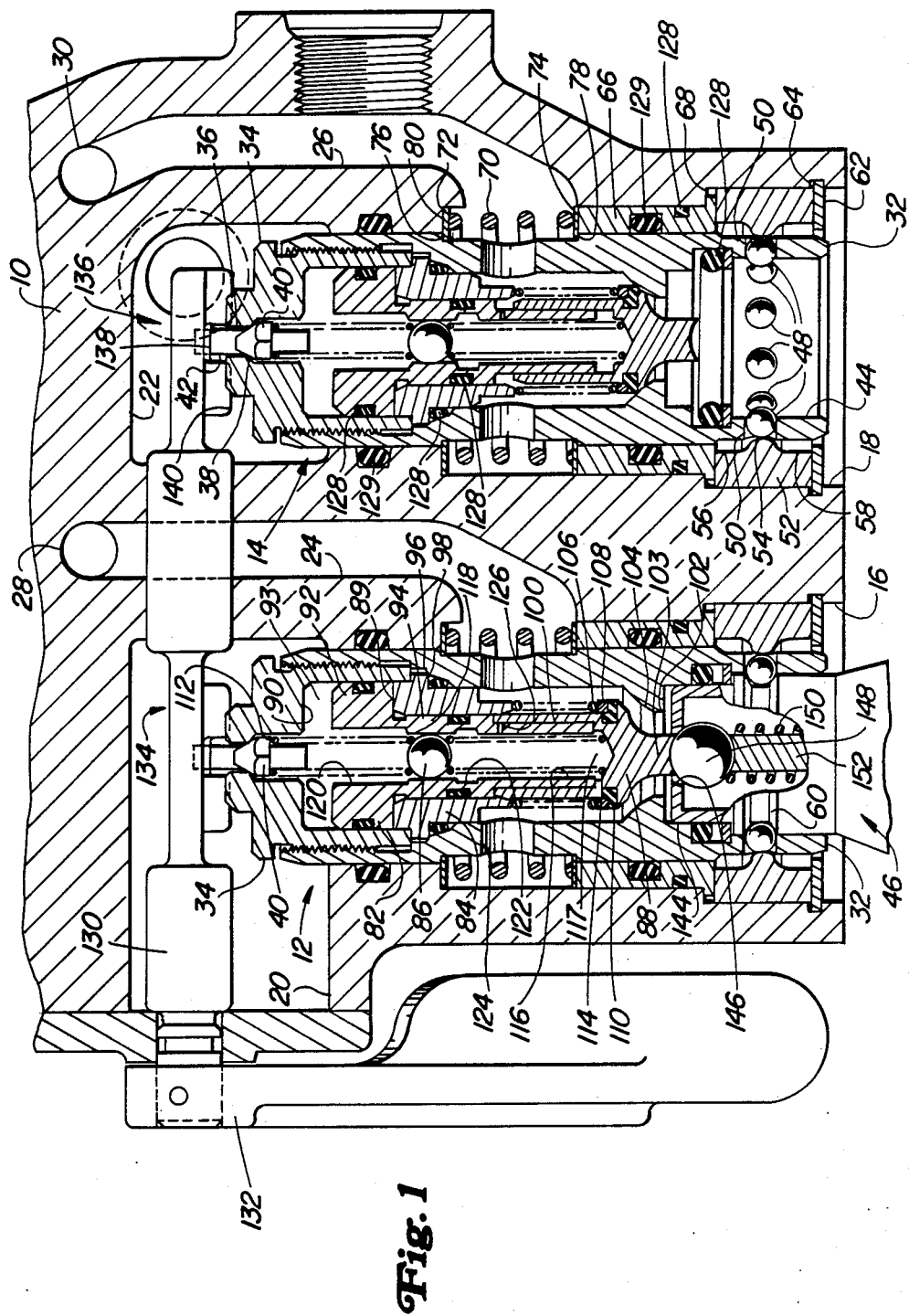
FIG. 1 depicts a preferred embodiment of two female couplers according to the present invention with a male coupler shown inserted in one of the female couplers.

FIG. 1 depicts a valve housing 10 with two female couplers 12, 14 according to the present invention. For convenience in describing the invention, the front, back, left and right sides of the female couplers 12, 14 will be assumed to correspond to the top, bottom, left and right of FIG. 1. It should be understood, however, that the couplers can be placed in any position. In addition, to avoid congestion in the drawing, most reference numbers are shown on only one of the couplers in FIG. 1. It should be understood that the same reference numbers could be applied to the identical parts of the other coupler.

Each of the female couplers 12, 14 is positioned within a corresponding stepped bore 16, 18 formed in the valve housing 10. The stepped bores 16, 18 end in respective sump chambers 20, 22, which are connected to a sump (not shown) for the hydraulic system in which the couplers 12, 14 are used. Each bore 16, 18 also is connected to a corresponding supply/return passage 24, 26 formed in the valve housing 10. These passages 24, 26 are connectible through schematically illustrated control valves 28, 30 to a source of pressurized fluid (no shown) or to the return for the system. Such control valves are well known to those of ordinary skill in the art and will not be described further herein.

Each of the female couplers 12, 14 has a hollow, substantially cylindrical receptacle 32 slidably positioned within the corresponding bores 16, 18. An end cap 34 closes off the front end of each receptacle 32. At least the end caps 34, and preferably the end cap 34 and the top portion of the receptacles 32 extend into the corresponding sump caambers 20, 22. Each end cap 34 is provided with a bleed opening 36 therein for hydraulically connecting the inside of the receptacle 32 with the corresponding sump chamber 20, 22. The inside of each end cap 34 adjacent to the bleed opening 36 is formed into a valve seat 38 against which a poppet 40 can seat to close off the bleed opening 36. Each poppet 40 has a nose 42 extending therefrom out through the bleed opening 36, for purposes described below. The poppet 40 and nose 42 preferably are of substantially the shape shown in FIGS. 3 and 4 of U.S. Pat. No. 4,303,098 (Shindelar), which is incorporated herein by reference.

The back end of each receptacle 32 is formed into a receiving bore 44 for receiving a male coupler therein. A typical male coupler 46 is shown inserted in the receiving bore 44 of left-hand female coupler 12, while right-hand female coupler 14 is shown without such a male coupler in place. As best seen in female coupler 14, receptacles 32 are provided with a plurality of lock balls 48 in a plurality of lock ball bores 50 circumferentially spaced about the receptacles 32. The lock balls 48 can move radially in and out within the lock ball bores 50, but are prevented from moving completely into the receiving bore 44 by a lip or narrowing of the lock ball bores 50 in known fashion. Radially outward movement of the lock balls 48 is limited by the inner surface of control sleeves 52, which circumferentially surround each receptacle 32. The inner surface of each control sleeve 52 has a land 54 formed thereon which gradually slopes away to recessed portions 56 and 58 to the front and back, respectively, of the land 54. When the lock balls 48 are positioned adjacent to the land 54, they are forced radially inward and extend into the receiving bore 44, where they can engage a suitable groove 60 formed in the outer surface of a male coupler 46, as illustrated in female coupler 12. In contrast, lock balls 48 can move radially outward to completely clear the receiving bore 44 when they are positioned adjacent to either of the recessed portions 56, 58.

As will be explained below, the receptacle 32 is biased to a position with the lock balls 48 adjacent to the land 54 on control sleeve 52. The control sleeves 52 themselves are prevented from moving towards the back of the coupler by lock rings 62 positioned in grooves 64 formed in bores 16, 18. Control sleeves 52 are prevented from moving towards the front of the female coupler by abutting against spacers 66, which rest against shoulders 68 formed at one of the steps in stepped bores 16, 18. The inner diameter of the spacers 66 preferably is about the same as the outer diameter of the receptacles 32 to provide additional support for the receptacles 32. Alternatively, each spacer 66 could be formed as a single piece with the corresponding annular control sleeve 52.

The receptacles 32 are biased to the positions illustrated in the figure by springs 70 and retaining rings 72, 74. The receptacles 32 have shoulders 76, 78 formed therein against which the retaining rings 72, 74, respectively, can abut. Retaining ring 72 also can rest against shoulders 80 formed in stepped bores 16, 18, while retaining rings 74 also can abut against the front end of spacers 66. Each spring 70 is compressed between the corresponding two retaining rings 72, 74.

With this construction, movement of a receptacle 32 backward (downward in FIG. 1) will press retaining ring 72 backward by virtue of its abutment against shoulder 76 on the receptacle 32. Retaining ring 74 will not move, however, due to its abutment against the front (upper) end of spacer 66. Spring 70 thus is compressed and, upon release of outside force, will move the receptacle 32 back to the position shown in the figure. Similarly, movement of the receptacle 32 forward (upward) will force the retaining ring 74 forward due to its abutment against shoulder 78 on the receptacle 32, while retaining ring 72 will not move due to its abutment on the shoulder 80 formed in the housing 10. Again, spring 70 will be compressed and will force the receptacle 32 back into the position shown in the figure upon release of the outside force. While the springs 70 and retaining rings 72, 74 are shown in a position adjacent to the passages 24, 26, they can be positioned anywhere along the receptacle 32.

As already noted, receptacles 32 are substantially hollow, and the back ends thereof are formed into receiving bores 44 for receiving male members 46. The balance of each receptacle 32 encloses four main elements: a piston 82, a stop 84, a check ball 86 and a main poppet 88.

Each piston 82 is axially movable between the inner surface 90 of the end cap 34 and the front surface 89 of the stop 84. The outer diameter of the piston head 92 is approximately the same as the inner diameter of the sides of the end cap 34, so that the piston head 92 is guided thereby. In addition, stop 84 is annular and the outer diameter of the piston rod 94 is substantially the same as the inner diameter of the stop 84, so that the piston rod 94 is guided by the stop 84. Movement of the stop 84 is prevented by compression of flange 96 of the stop 84 between the end cap 34 and a shoulder 98 formed in the internal diameter of the receptacle 32.

The main poppet 88 has a cylindrical extension 100 which surrounds the lower end of the piston rod 94. The rear end of the piston rod 94 is somewhat narrower in diameter than the front portion thereof and the outer diameter of the main poppet cylindrical extension 100 is substantially the same as the inner diameter of the stop 84, so that the piston rod 94 and stop 84 together serve to guide the main poppet 88. The inner diameter of the receptacle 32 narrows to form a main valve port 102 immediately in front of the receiving bore 44. The surface of the receptacle in the region of the main valve port 102 is shaped to form a valve seat 104 against which the main poppet 88 can rest to close off the main valve port 102. The main poppet 88 is biased against the main valve seat 104 by a compression spring 106 extending between the back end of the stop 84 and a washer 108 which surrounds the main poppet cylindrical extension 100. The washer 108 in turn rests on a gasket 110 surrounding the main poppet 88 and resting upon a shoulder in the main poppet 88.

The main poppet 88 also is biased against the valve seat 104 by compression springs 112, 114 which are positioned largely within a central bore 116 formed along the length of piston 82. In particular, one end of spring 112 presses against the base of bleed poppet 40, while the other end presses against check ball 86. One end of spring 114 presses against check ball 86, while the other end presses against the inside front surface of main poppet 88.

Piston central bore 116 has a land 118 and two recessed portions 120, 122 formed therein. The inner diameter of the land 118 is substantially the same as the outer diameter of the check ball 86, so that fluid flow past check ball 86 is substantially prevented when it is positioned adjacent to the land 118. In contrast, the recessed portions 120, 122 on either side of the land 118 have a diameter sufficiently larger than the outer diameter of check ball 86 to allow easy flow past the check ball 86 when the check ball 86 is positioned adjacent to either of the recessed portions 120, 122. Springs 112, 114 normally bias check ball 86 into a position where it engages the land 118 and prevents flow through the central bore 116. However, spring 114 is somewhat stronger than spring 112, so that a substantially larger pressure is required on the front of check ball 86 to move it to a position adjacent recessed portion 122 than is required on the back of check ball 86 to move it to a position adjacent recessed portion 120.

A plurality of ports 124 are circumferentially spaced about each receptacle 32 to allow fluid communication between the passages 24, 26 and the inside of the receptacles 32. A passage 126 which is small enough to act as a flow-limiting orifice is provided in the piston 82 to allow flow from the outside of the piston 82 and main poppet 88 into the bottom portion of the piston central bore 116. The fit between the outer diameter of piston 100, the main poppet 88 and the inner diameter of the stop 84 should be loose enough to allow flow therebetween to the passage 126 at all times. Alternatively, or additionally, the fit between the outer diameter of the piston rod 94 and the main poppet cylindrical extension 100 can be loose enough to allow flow therebetween, though this fit should still be tight enough that it acts as a flow-limiting orifice. Finally, numerous seals 128, 129 are provided as needed to prevent fluid flow between any parts of the female couplers 12, 14 other than the flow described below. It has been found that the couplers work best if the surfaces of the main seals 129 which engage receptacles 32 are formed of a low drag material, e.g., polytetrafluoroethylene (Teflon) or graphite-filled Teflon.

Figure 2A:
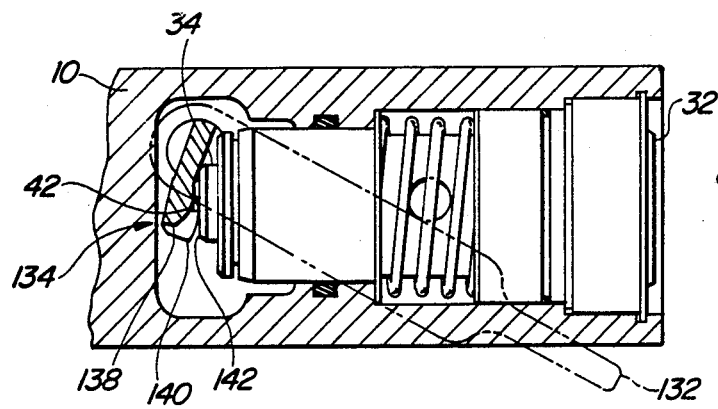
FIGS. 2a–2c depict the position of the lever and engagement of the cam surfaces of one of the female couplers depicted in FIG. 1.
Figure 2B:
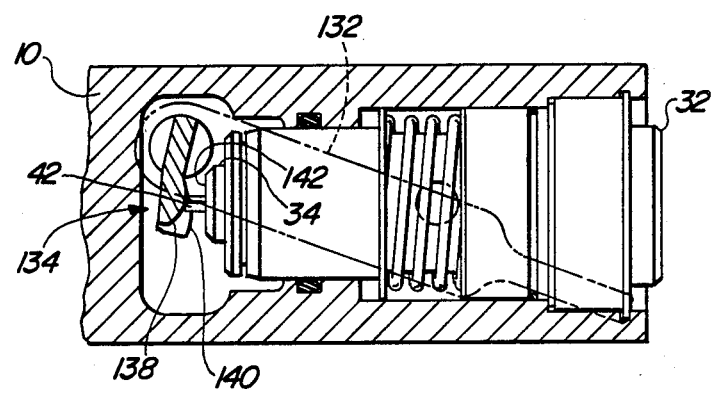
Figure 2C:
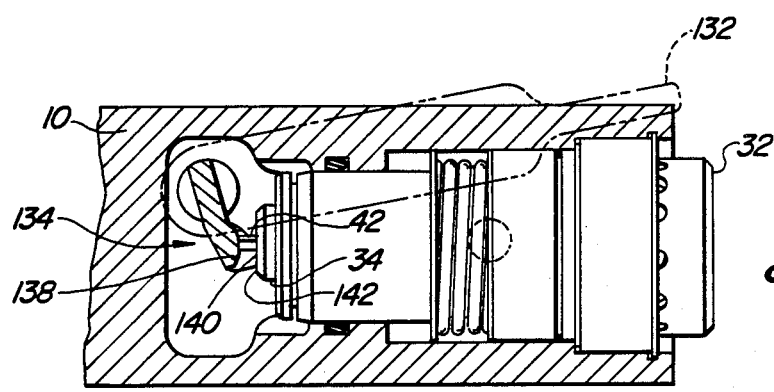

As will be described below, the female couplers 12, 14 are operable by lever-actuated cams. The cam surfaces preferably are carried on a rod 130 which is pivotally mounted in the valve housing 10 and operable by the lever 132 connected to one end thereof. In the embodiment shown in FIG. 1, the rod 130 has two sets 134, 136 of cams, each being positioned in association with a corresponding one of the female couplers 12, 14. As best seen in FIGS. 2a–c, each set 134, 136 of cams has at least two cam surfaces: first, a cam surface 138 to engage the bleed poppet nose 42; second, a cam surface 140 to engage the front end 142 of the end cap 34. Preferably, as illustrated in FIG. 1, each set 134, 136 has three cam surfaces, namely, one cam surface 138 and two cam surfaces 140 on either side thereof. Cam surface 138 also preferably engages bleed poppet nose 42 at a slight angle rather than in line in order to reduce the force required to break the seal between the bleed poppet 40 and the bleed valve seat 38.

A typical male coupler 46 is illustrated in FIG. 1 coupled to female coupler 12 for purposes of description of the operation of the present female couplers. The male coupler 46 includes a substantially cylindrical tip 144 which fits snuggly into the receiving bore 44 formed in the female coupler 12. As already mentioned, a groove 60 is formed in the outer circumference of the male tip 144 for engagement with the locking balls 48 of the female coupler 12. An opening 146 is formed in the end of the male coupler tip 144 and is closeable by a check ball 148. Male check ball 148 is biased to a position closing opening 146 by spring 150. A stop 152 is provided in male coupler 146 to limit motion of the check ball 148 away from the opening 146.

OPERATION

The female couplers according to the present invention can be connected to male couplers either by pushing the male couplers into the female couplers or by using the lever 132. Similarly, male couplers can be disconnected either by simply pulling them from the female couplers or by using the lever 132. Details of the operation are as follows:

Push Coupling: To push couple a male coupler 46 to the female couplers 12, the male coupler 46 is simply pushed into the receiving bore 44 of the female coupler 12. At least part of the male coupler tip 144 in front of the groove 60 has a larger diameter than the groove 60, with the result that as the male coupler 46 is pressed into the receiving bore 44, it presses the locking balls 48 forward. This in turn presses the entire receptacle 32 forward. Such forward motion brings the bleed poppet nose 42 into contact with the cam surface 138. Further motion in this direction presses the cam surface 138 backwards into the position shown in FIG. 2a. In this position, the pressure on the bleed poppet nose 42 pushes the bleed poppet 40 away from the bleed valve seat 38, opening bleed opening 36 and allowing any fluid accumulated in hydraulic chamber 93 (see FIG. 1) to bleed into the sump chamber 20. This forward movement of the receptacle 32 eventually carries the locking balls 48 far enough forward that they are adjacent to the recessed portion 56, and can move radially out of the receiving bore 44, allowing the male coupler 46 to completely enter the receiving bore 44. Finally, this motion will compress the various springs in the female coupler, so that the springs will return the receptacle 32 to the position illustrated in FIG. 1 upon release of the male coupler 46, with the bleed poppet 44 closed and the lock balls 48 firmly engaged in the locking groove of male coupler 46.

As the male coupler 46 is inserted into the receiving bore 44, the nose 103 of the main poppet 88 will come into contact with the male check ball 148. The female coupler 12 is depressurized due to the above-described opening of the bleed poppet 40. If the male coupler 46 is under pressure, the male check ball 148 will remain seated against the opening 146 and will press the main poppet 88 forward. This in turn will press the piston 82 forward, reducing the size of the chamber 93. If the male coupler 46 is not pressurized, the position of the main poppet 88 and male check ball 148 within the receptacle 32 will depend upon the relative strengths of the male coupler spring 150 and springs 106, 112, and 114 in the female coupler 12.

In either event, it is desirable to have the male check ball 148 pressed fully back against the stop 152 by the main poppet nose 103, as shown in FIG. 1, to ensure full flow between the couplers in use. To accomplish this, once the male coupler 46 is mechanically locked in place by the check balls 48, the control valve 28 is opened to provide pressurized fluid to supply passage 24. This fluid then passes through ports 124 and orifice 126 into the rear portion 117 of the central bore 116 of the piston 82. As pressure accumulates in the rear portion 117 of the central bore 116, it will force the check ball 86 forward until it is adjacent to the recessed portion 120. Fluid then can flow into the chamber 93. Increasing pressure in chamber 93 will force the piston 82 rearwards, in turn pressing the main poppet 88 rearwards until it presses the male check ball 148 towards stop 152. Pressure will continue to increase in chamber 93 until the pressure therein differs from the pressure in the rear portion 117 of central bore 116 only by the amount of force provided by springs 112, 114, and check ball 86 will move back into the position engaging land 118, preventing further flow into chamber 93. The stable operating position of the female coupler 12, as shown in FIG. 1, is thus obtained.

After this position is obtained, control valve 28 can be operated to supply pressurized fluid to passage 24 or to connect passage 24 to sump. In either event, the opening 146 will remain open due to the fluid trapped in chamber 93 by check ball 86. The mechanism also will prevent a momentary closing of the male coupler 46 due to a sudden surge of flow through the male coupler 46, e.g., such as might occur if a cylinder to which the coupler 46 is connected received a sudden push from an outside source. Such surges typically are quite brief, and while the surge might be able to force piston 92 upwards slightly to allow the check valve 148 to close slightly, the accumulated pressure in chamber 93 will push the piston 92 back downwardly so that the male coupler 46 will remain open and will open fully when the surge dies down. Even if the sudden pressure increase in chamber 93 is sufficient to move the check ball 86 downwardly to a position adjacent recessed portions 122 in the central bore 116, fluid cannot leave the central bore 116 quickly due to the flow-limiting nature of orifice 126, and therefore male coupler opening 146 remains open. This fluid pressure therefore will be forced back upwards into chamber 93 after the pressure surge subsides.

While fluid flow from chamber 93 out through passage 126 generally is undesirable, it becomes desirable if the fluid in chamber 93 heats excessively. Spring 114 is chosen to have a strength such that upon sufficient thermal expansion of any fluid in chamber 93, check ball 86 will be moved into a position adjacent recessed portions 122, allowing fluid flow through central bore 116 and passage 126 to relieve excess pressure.

Pull Decoupling: The male coupler 46 can be disconnected from the female coupler 12 simply by pulling it out of the female coupler 12. The large diameter portion of the male coupler tip 144 again will move the lock balls 48 and receptacle 32, this time rearwardly. Eventually, this motion will bring the lock balls 48 into alignment with the recessed portion 58, allowing them to move radially out of the receiving bore 44 and allowing the male coupling 46 to slide out of the receiving bore 44. Spring 150 will press male check ball 148 up into engagement with opening 146 to seal the male coupler 46, while springs 106, 112 and 114 will press main poppet 88 down against seat 104 to close the female coupler 12.

Lever Coupling: In its neutral position, the lever 132 rests in the position shown in FIG. 2b. In this position, there is some space between the cam surface 140 and the top end 142 of the end cap 34. Preferably, there also is a slight amount of space between the cam surface 138 and the nose 42 of the bleed poppet 40, so that the bleed poppet 40 will not be opened accidentally due to jiggling of the cam surface 138, e.g., due to movement over rough terrain.

To lever couple, lever 132 is moved to the position shown in FIG. 2c. This initially brings cam surface 138 into contact with bleed poppet nose 42 to open bleed poppet 40 and bleed chamber 93, in much the same fashion as described in connection with push coupling. Cam surface 140 then is brought into contact with the front end 142 of end cap 34, pushing end cap 34 and receptacle 32 attached thereto rearwardly. This moves the lock balls 48 into alignment with the recessed portion 58, allowing the lock balls 48 to move radially out of the receiving bore 44. Male member 46 then can be inserted into the receiving bore 44. This movement of the receptacle 32 has simultaneously compressed spring 70, so that the receptacle 32 will be forced forward upon release of lever 132. This will again bring lock balls 48 into alignment with land 54, forcing them into the receiving bore 44 and into engagement with groove 60 in the male member 46. Coupling then is completed by cycling the valve 28 in substantially the same fashion described in connection with push coupling.

Lever Decoupling: Movement of lever 132 to the position shown in FIG. 2c when a male member 46 is coupled to the female member 12 provides a controlled effort disconnect of the couplers. Again, as the lever 132 is moved into the position shown in FIG. 2c, it first will open the bleed poppet 40 to bleed chamber 93. Continued movement of the lever will press the receptacle 32 rearwardly until the locking balls 48 are aligned with recessed portion 58 and can radially withdraw from the receiving bore 44. At this point, the combined spring forces of springs 106, 112, 114, and 150 will tend to force the male coupler 46 out of the receiving bore 44. Again, spring 150 will move check ball 148 to close off the male coupler 46 and springs 106, 112, 114 will move main poppet 88 to close off female coupler 12.

While the foregoing lever coupling and decoupling has been described in connection with a single female coupler 12, it will be apparent that lever decoupling will simultaneously disconnect all couplers connected to the lever. In addition, lever decoupling is preferable to pull decoupling since some of the fluid in the female couplers is drained back to sump through the bleed opening 36, reducing the amount of fluid loss upon decoupling.

While lever coupling of multiple valves is possible, it would be somewhat cumbersome if multiple independent hoses were involved since all of the hoses have to be held in the female couplers until the lever is released. However, it can be quite convenient if the multiple hoses are held by a bracket or similar structure so that they are properly spaced relative to the female couplers. The lever then can be activated, all of the hoses moved forward simultaneously, and the lever released.

If desired, the lever can be used to bleed all of the couplers prior to push coupling by moving the lever forward to engage the various bleed poppets. The amount of force required to push the male couplers into the female couplers depends upon the initial pressure in the female couplers. By using the lever to bleed the female couplers, the force required for push coupling can be minimized.

While the present invention has been described with reference to a particular preferred embodiment thereof, one of ordinary skill in the art could make numerous modifications thereto without exceeding the scope of the present claims. For example, while the extension 100 of main poppet 88 has been shown as surrounding the rod portion 94 of piston 82, it could instead extend inside central bore 116, e.g., as shown in U.S. Pat. No. 4,549,577 (Kugler). Similarly, while the rod 130 has been shown as operating two female couplers, it could be set up to operate more or less than two couplers.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A female hydraulic coupler comprising:
   (a) a housing having formed therein a stepped bore, a sump chamber at one end of said stepped bore and a fluid passage connecting to said stepped bore;
   (b) a hollow substantially cylindrical receptacle slidably mounted within said stepped bore, said receptacle having a sump end at least adjacent to said sump chamber and a receiving end away from said sump chamber, and further having:
      (1) a receiving bore formed at said receiving end of said receptacle for receiving a male coupler, with a plurality of lock ball bores spaced around said receiving bore and extending substantially radially through said receptacle;
      (2) a plurality of lock balls, each being disposed in a corresponding one of said lock ball bores;
      (3) a main valve seat formed on an inner surface of said receptacle adjacent to said receiving bore; and
      (4) first and second shoulders formed in the outer circumference of said receptacle;
   (c) an end cap sealingly closing said sump end of said receptacle, said end cap extending into said sump chamber of said housing;
   (d) a piston slidably mounted within said end cap and said receptacle, said piston having:
      (1) a piston head slidably received within said end cap, said piston head, end cap and receptacle defining a piston chamber therebetween; and
      (2) a piston rod extending towards said receiving bore;
   (e) piston fluid connection means for fluidly connecting said fluid passage formed in said housing with said piston chamber;
   (f) a main poppet slidably mounted to said piston rod and sealable against said main valve seat to seal the receiving bore off from the remainder of the receptacle;
   (g) spring means for biasing said main poppet towards said main valve seat;
   (h) an annular control sleeve surrounding the receiving bore end of said receptacle and having a land formed on the inner surface thereof with a recess formed on either side of said land, said control sleeve forcing said lock balls into a position extending inside said receiving bore when said lock balls are positioned adjacent said land and allowing said lock balls to move to a position completely outside of said receiving bore when said lock balls are positioned adjacent either of said recesses;
   (i) first and second washers surrounding said receptacle, each washer being engagaeable with one of said shoulders formed on said receptacle exterior and with one of a corresponding shoulder formed in said stepped bore in said housing and said control sleeve;
   (j) a receptacle spring surrounding said receptacle and compressed between said first and second washers;
   (k) a cam shaft pivotally mounted in said housing adjacent said end cap and having an end cap cam surface thereon for engaging said end cap; and
   (l) a lever connected to said cam shaft for rotating said cam shaft.

2. The female coupler of claim 1, wherein said end cap has a bleed passage formed therethrough to fluidly connect the inside of said end cap with said sump chamber, and further comprising:
   a bleed poppet inside said end cap and seatable against said end cap to seal said bleed bore, said bleed poppet having a nose extending through said bleed bore to the exterior of said end cap; and
   a bleed poppet cam surface formed on said cam shaft for engaging said bleed poppet nose, said end cap and bleed poppet cam surfaces being so shaped that said bleed poppet cam surface will press against said bleed poppet nose before said end cap cam surface will press against said end cap upon movement of either said cam shaft or said receptacle.

3. The female coupler of claim 2, wherein said piston fluid connection means comprises a central bore extending at least part of the length of the piston from said piston head to said piston rod and a substantially radial passage formed in said piston rod connecting the outside of the piston rod with said central bore.

4. The female coupler of claim 3, wherein said piston fluid connection means further comprises at least one port formed in said receptacle fluidly connecting the inside of said receptacle with said fluid passage formed in said housing, said at least one port opening into the inside of said receptacle on the opposite side of said main valve seat from said receiving bore.

5. The female coupler of claim 4, wherein said radial passage in said piston rod connects to said central bore at a portion thereof on the opposite side of said land from said piston head.

6. The female coupler of claim 3, wherein said central bore has a land and two recessed portions on either side of the land formed therein, and wherein said female coupler further comprises:
   (a) a check ball disposed within said central bore of said piston, an outer diameter of said check ball being substantially the same as an inner diameter of said land in said central bore and less than an inner diameter of said recesses on either side of said land;
   (b) a first check ball spring extending between said bleed poppet and said check ball for biasing the bleed poppet towards said bleed bore and the check ball away from said bleed bore; and
   (c) a second check ball spring extending between said check ball and said main poppet for biasing said main poppet towards said main valve seat and said check ball towards said bleed bore, said second check ball spring having a higher spring constant than said first check ball spring.

7. The female coupler of claim 6, wherein said radial passage formed in said piston rod is of a size such that it acts as a flow-limiting orifice.

8. The female coupler of claim 1, further comprising an annular stop within said receptacle, clamped between said end cap and a shoulder formed in the inner surface of said receptacle, said stop serving to limit movement of said piston away from said end cap.

9. The female coupler of claim 8, wherein said main poppet has a blind bore formed therein into which at least a portion of said piston rod extends.

10. The female coupler of claim 9, wherein an outer diameter of at least a first portion of said main poppet is substantially the same as an inner diameter of said annular stop, and said first portion is slidable within said annular stop.

11. The female coupler of claim 10, wherein a second portion of said main poppet has a larger diameter than said first portion, and said spring means comprises a spring compressed between said second portion and said annular stop.

12. A coupler system comprising a plurality of the female couplers of claim 1, further comprising means for connecting the cam shafts for each of the couplers to be rotatable by a single lever.

13. The coupler of claim 12, wherein said cam shafts comprise a single rod mounted in said housing, with appropriate cam surfaces formed therein or each coupler, and wherein said single lever is connected to said rod to rotate said rod.

14. The coupler system of claim 13, wherein said plurality of female couplers consists of two female couplers.

* * * * *